United States Patent [19]

Semchuck

[11] 4,268,345
[45] May 19, 1981

[54] CONTINUOUS LAMINATING SYSTEM

[75] Inventor: Mario E. Semchuck, Buffalo Grove, Ill.

[73] Assignee: General Binding Corporation, Northbrook, Ill.

[21] Appl. No.: 86,153

[22] Filed: Oct. 18, 1979

[51] Int. Cl.³ .............................................. B30B 15/34
[52] U.S. Cl. ............................. 156/499; 100/93 RP; 156/537; 156/555; 156/583.1
[58] Field of Search ............... 156/499, 555, 583.1, 156/583.5, 583.2, 583.9, 515, 537, 582; 100/93 RP, 154

[56] References Cited

U.S. PATENT DOCUMENTS

| | | | |
|---|---|---|---|
| 3,215,065 | 11/1965 | Malarkey, Jr. | 100/93 RP |
| 3,309,983 | 3/1967 | Dresser | 156/555 |
| 3,551,259 | 12/1970 | Schwarzkopf | 156/583.2 |
| 3,823,047 | 7/1974 | Colombo | 156/555 |
| 3,830,681 | 8/1974 | Wilson | 156/583.2 |
| 4,064,299 | 12/1977 | Martin | 100/93 R |
| 4,090,911 | 5/1978 | Shaffer | 156/555 |
| 4,172,750 | 10/1979 | Giulie | 100/93 RP |

Primary Examiner—Michael G. Wityshyn
Attorney, Agent, or Firm—Hill, Van Santen, Steadman, Chiara & Simpson

[57] ABSTRACT

A continuous laminating system is disclosed wherein a pair of rotating laminating rollers are provided which form a laminating nip through which a product to be laminated together with sheets of laminating film are fed and pressed. A pair of rearwardly positioned pull rollers pull the laminating film through the laminating rollers together with the product. Adjacent each laminating roller a shoe-type heating member is provided which has a concave surface adjacent the respective laminating roller and a convex heating surface positioned so that the laminating film from each of the supply rollers slides over the heating surface and is heated prior to entry into the laminating nip. A Teflon-coated fiberglass layer is provided at least over portions of the convex heating surface over which the laminating film slides. Problems of scratching of the laminating film and squealing during processing are solved according to the invention.

10 Claims, 4 Drawing Figures

CONTINUOUS LAMINATING SYSTEM

BACKGROUND OF THE INVENTION

In large scale laminating systems, it is known to provide upper and lower feed rollers for continuously supplying a strip or sheet of laminating film which has a heat sensitive adhesive on a product-facing surface thereof. Such laminating films are well known in the art as polyethylene films which are transparent and which have a heat sensitive adhesive thereon which joins to the product to be laminated and also to the opposite facing thin film so as to form a packet. In the large scale laminating systems, the laminating film is fed continuously and after the laminating of a continuous product, the product is slit transversely to the running direction of the laminated product and/or along the direction of travel so as to cut the laminated product into individual units such as I.D. cards.

With such systems, it is also known to provide a heating shoe or member positioned adjacent each of the laminating rollers such that the continuous rolls of film being supplied from the supply rollers pass over a heating surface of the shoe just prior to entering a nip between the upper and lower laminating rollers. These shoes heat the laminating film to a desired temperature just prior to the pressure laminating in the nip between the two laminating rollers.

Previously, as the film is dragged over the hot shoe, miniscule irregularities in the shoe surface would scratch the film and introduced obvious marking to the detriment of ultimate use. While the functional use of the finished laminate was not greatly affected, the aesthetics were such that the commercial viability of such large scale laminating systems was impaired.

In addition to the scratching problem, the dragging of the film over the shoes especially at high speed and elevated temperatures consistently produces a high pitched squeal. This squeal at times becomes intolerable.

Attempts have been made to solve the squealing problem by altering the tension on the webs or dampening. Neither approach was successful.

SUMMARY OF THE INVENTION

It is an object of this invention to prevent scratching of laminating film in large scale laminators and at the same time to eliminate a high pitched squeal caused by the dragging of the laminating film over the heat shoes. In accordance with the invention, on a heat shoe having a concave inner surface adjacent to a laminating roller and a convex heating surface over which the laminating film slides, a layer of Teflon-coated fiberglass is provided which covers at least all portions of the convex heating surface directly over which the laminating film would otherwise slide. Preferably the Teflon-coated fiberglass is preferably of a material known by the registered trademark TEMP-R-GLAS, a product of the Conneticut Hard Rubber Company (CHR).

Preferably the layer of Teflon-coated fiberglass is clamped to non-heating surfaces of the heating member but is not directly secured to portions of the convex heating surface.

Previous to the discovery of this invention, it was thought that sheets of material applied to the heating surfaces could never solve the problems of scratching and squealing since such separate layers would greatly reduce the heat transfer between the laminating film and the heat shoe. Furthermore, Teflon layers directly applied to the heating shoe surface or applied after roughening of the heating surface, were tried and rejected since either the scratching problem was partially corrected without correcting the squealing problem or the squealing problem was partially corrected without correcting the scratching problem.

Upon wrapping a sheet or layer of the Teflon-coated fiberglass over the heating surfaces of the heating shoes it was unexpectedly discovered that heat transfer was not adversely affected and both the squealing and scratching problems were virtually completely eliminated.

DESCRIPTION OF THE PREFERRED EMBODIMENTS

Figure 1:
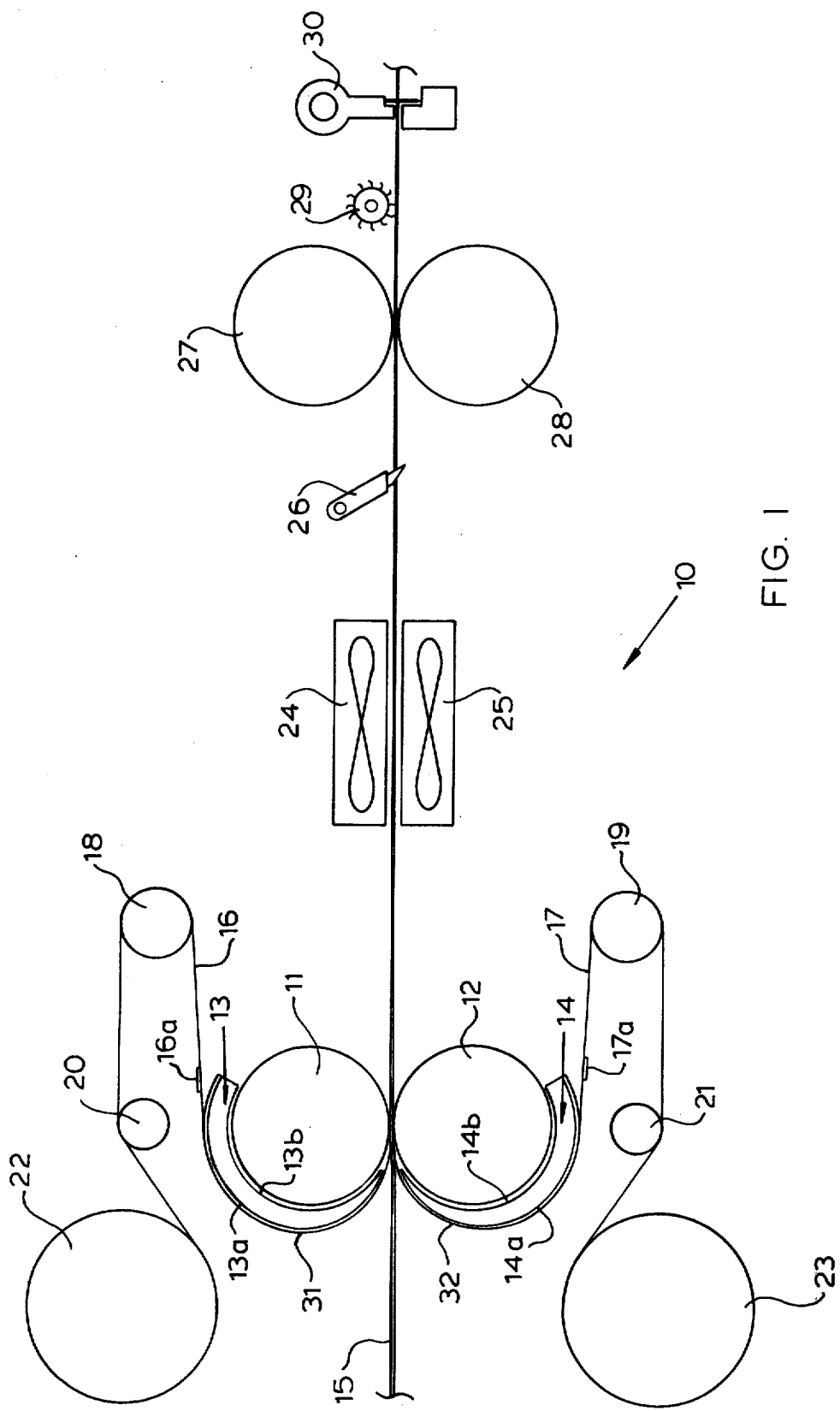
FIG. 1 is a side view of the improved laminating system of the invention.

The improved laminating system of the invention is generally shown at 10 in FIG. 1. An upper freely movable, driven laminating roller 11 is positioned adjacent and in contact with a lower freely movable driven laminating roller 12 so as to form a pressure nip between the two rollers for laminating. An upper heater member 13 typically known as a "heating shoe" is provided adjacent the upper roller 11. Similarly a lower heating member 14 is provided. Each of these heating members has respective concave inner surfaces adjacent to and of a curvature similar to the respective laminating rollers and also having convex heating surfaces 13a and 14a over which respective upper and lower laminating films 16 and 17 slide.

A continuous product 15 to be laminated is fed toward the nip between the laminating rollers 11 and 12 together with the laminating films 16 and 17 above and below the product 15.

The laminating film 16 or 17 is typically a polyethylene sheet or strip of film suitable for laminating, as is well known. On this sheet or film a layer of heat activatable adhesive 16a or 17a is applied on the surface away from the heating member surfaces 13a and 14a but facing the product 15 to be laminated. The films 16 and 17 respectively ride over de-wrinkling rollers 18 or 19 respectively, and respective idler rollers 20 and 21. Film supply rolls 22 and 23 feed a continuous supply of the respective laminating films 16 or 17.

Rearwardly or downstream of the laminating rollers 11 and 12 cooling fans 24 and 25 above and below the laminated product may be provided to enhance cooling. Thereafter, a slitter 26 is provided for slitting the product in the running direction thereof. The slit product preferably enters upper and lower pull rollers 27 and 28 which are driven and therefore pull the product through the freely movable upper and lower laminating rollers 11 and 12. A static eliminator 29 may be provided downstream of the pull rollers together with a cross or transverse cutting member 30 which cuts the individual products after lamination is completed.

Figure 2A:
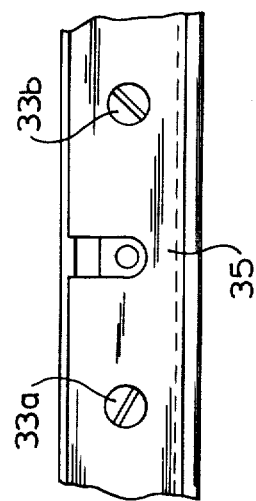
FIG. 2A is a plan view of the retaining plate attaching one end of the Teflon-coated fiberglass sheet to the heating member.
Figure 2:
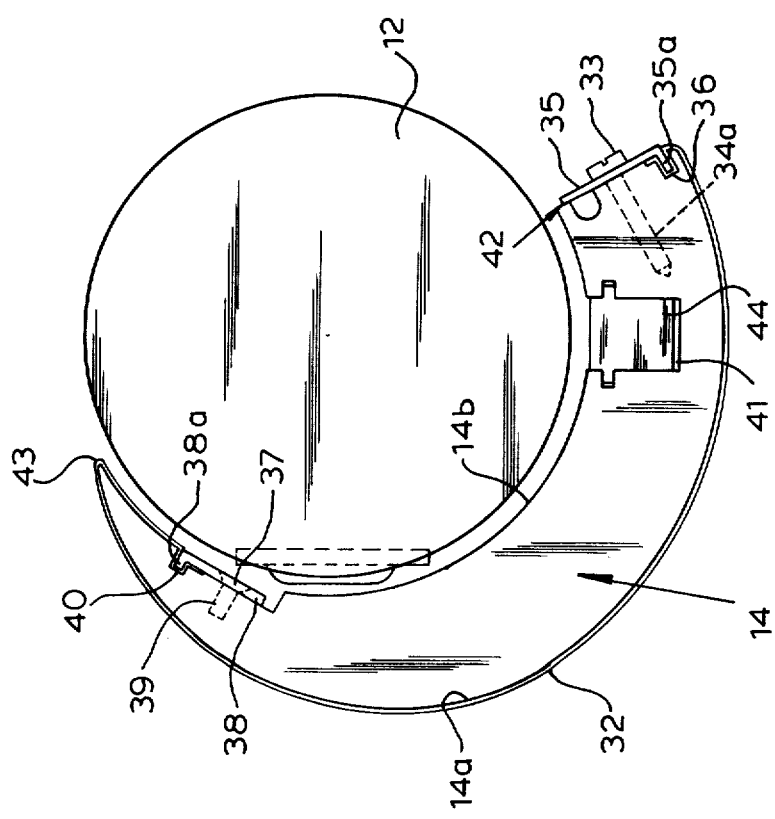
FIG. 2 is a side cross-sectional view showing details of the improvement of the invention as applied to the heating member of the heating system of FIG. 1.

Over the respective heating member heating surfaces 13a and 14a a layer or sheet of Teflon-coated fiberglass 31 or 32, (Teflon being a trademark of DuPont) is tightly wrapped as most clearly shown in FIG. 2. In a preferred embodiment of the invention, the Teflon-coated fiberglass is a material sold under the trademark TEMP-R-GLAS of the Conneticut Hard Rubber Company (CHR).

The Teflon-coated fiberglass employed in the invention has a preferable thickness between 0.003 and 0.010 inches, but in any case no greater than 0.030 inches. Greater thicknesses cannot be employed since they adversely effect heat transfer. Also the fiberglass material employed should function efficiently through a temperature range of room temperature to a least 200° F. Furthermore the material has a "slippery" quality sufficient to substantially prevent squealing and scratching during lamination.

As shown in FIG. 2, the lower shoe or heating member 14 is closely aligned adjacent the lower laminating roller 12. The convex heating surface 14a has the Teflon-coated fiberglass 32 pulled thereover and the concave inner surface 14b is aligned directly adjacent the outer periphery of the roller 12.

The heating member 14 has its convex and concave surfaces 14a and 14b terminating in one end at a flat wall 42 substantially perpendicular to the adjacent portions of the concave and convex surfaces. One end of the sheet 32 is bent over into contact with this wall 42 where it is clamped by use of a retaining plate 35 more clearly shown in the end view of FIG. 2A. This retaining plate 35 traps the end of the sheet 32 between itself and the end wall 42 by use of two flathead screws 33a, b received in threaded bores 34a, b of the heating element. A lip 35a is provided on the retaining plate 35 which cooperates with a depression 36 in the heating member for the purpose of more securely fastening the end of the sheet 32 to the end wall 42.

At the opposite end of the heating member 14 the convex and concave surfaces 14a and 14b intersect along an edge 43. The other end or edge of the Teflon-coated fiberglass sheet 32 is folded over and around the leading edge 43 so that its edge portion lies on a portion of the concave surface 14b. Here it is fastened again by use of a retaining plate 38 having a lip 38a which cooperates with a depression 40 in the heating member. A threaded bore 39 receives an undercut flathead screw 37 which retains the plate to the concave inner surface 14b. As shown, a portion of the concave surface 14b may be carved out so as to allow sufficient clearance between the head of the screw 37 and the outer periphery of the roller 12.

With this system of attachment, the Teflon-coated fiberglass sheet is not directly contacted to any portion of the heat transfer surface 14a but only at ends of the sheet 32.

Figure 3:
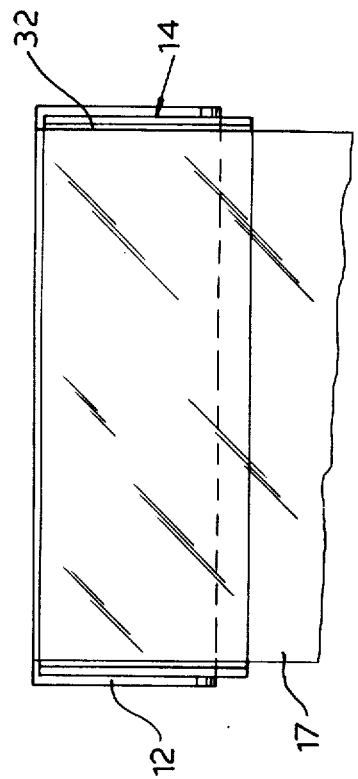
FIG. 3 is a front view of the heating member of the laminating system of FIG. 1.

As shown in FIG. 3, the width of the sheet 32 is at least as great as the width of the laminating film 17 but need be no wider than a width of the heating member 14.

The heating member 14 may employ various types of heating elements. In one preferred embodiment, a pocket 41 is provided for receiving a heating element 44. Alternatively, rod type heating elements or flat sheet type heating elements may also be applied to the heating member 14.

Although various minor modifications may be suggested by those versed in the art, it should be understood that I wish to embody within the scope of the patent warrented hereon, all such embodiments as reasonably and properly come within the scope of my contribution to the art.

I claim as my invention:

1. A continuous laminating system, comprising: a pair of rotating laminating rollers in contact to form a laminating nip through which a product to be laminated is fed; a pair of driven pull rollers spaced downstream from the laminating rollers and also forming a nip; a pair of laminating film supply rollers each supplying a continuous strip of laminating film positioned through the nip of the laminating rollers rearwardly to and through the nip of the pull rollers; a heating member adjacent each laminating roller and having a concave inner surface adjacent to and having a surface curvature corresponding to a peripheral portion of the respective laminating roller, and a convex heating surface over which the respective laminating film slides prior to entering the nip formed by the laminating rollers; and a layer of Teflon-coated fiberglass covering at least all portions of the convex heating surface directly over which the laminating film would otherwise slide whereby scratching of the laminating film is reduced, squealing caused by movement of the laminating film over the heating member is prevented, and effective heat transfer is maintained.

2. The system of claim 1 wherein ends of the Teflon-coated fiberglass layer are clamped to non-heating surfaces of each heating member and are not directly secured to said portions of the convex heating surface.

3. The system of claim 2 wherein the ends are clamped by plates drawn against the non-heating surfaces by screws.

4. The system of claim 3 wherein the plates have a lip which engages the end of the fiberglass layer in a depression in the non-heating surface of the heating member.

5. The system of claim 2 wherein the convex and concave surfaces converge at one end of the heating member to form an edge and terminate at a wall portion at the other end, one edge of the fiberglass layer lapping around said edge and being clamped thereat against a portion of the concave surface, and an opposite edge of the layer being clamped against said wall portion.

6. The system of claim 1 wherein at least one heating element is embedded in the heating member.

7. The system of claim 1 wherein the Teflon-coated fiberglass comprises material which functions without substantial degradation during exposure to temperatures of room temperature to at least 200° F.

8. The system of claim 1 wherein the fiberglass layer is no thicker than 0.030 inches.

9. The system of claim 1 wherein one end of the fiberglass layer laps around a leading edge of the heating member and the other end is secured against a wall surface running between the convex and concave surfaces.

10. A continuous laminating system, comprising: a pair of laminating rollers in contact to form a laminating nip through which a product to be laminated is fed; a pair of laminating film supply rollers each supplying a continuous strip of laminating film with heat activatable adhesive thereon to and through the laminating nip; a heating member adjacent each laminating roller having a convex heating surface positioned such that the laminating film slides over the heating surface and is heated thereat by heat transfer; and a sheet of Teflon-coated fiberglass covering at least all portions of the convex heating surface over which the laminating film would otherwise slide.

* * * * *